United States Patent
Iida

(10) Patent No.: US 11,383,659 B2
(45) Date of Patent: Jul. 12, 2022

(54) VEHICLE POWER SUPPLY APPARATUS

(71) Applicant: SUBARU CORPORATION, Tokyo (JP)

(72) Inventor: Minoru Iida, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 0 days.

(21) Appl. No.: 17/345,788

(22) Filed: Jun. 11, 2021

(65) Prior Publication Data

US 2022/0024398 A1  Jan. 27, 2022

(30) Foreign Application Priority Data

Jul. 27, 2020 (JP) .............................. JP2020-126679

(51) Int. Cl.
*B60R 16/033* (2006.01)
*B60L 1/00* (2006.01)

(52) U.S. Cl.
CPC .............. *B60R 16/033* (2013.01); *B60L 1/00* (2013.01); *B60L 2210/10* (2013.01)

(58) Field of Classification Search
CPC ......... Y02T 10/72; Y02T 10/40; Y02T 10/62; B60L 1/00; B60R 16/033
See application file for complete search history.

(56) References Cited

U.S. PATENT DOCUMENTS

| | | | | |
|---|---|---|---|---|
| 9,651,927 B2* | 5/2017 | Noguchi | ........... | H01M 8/04925 |
| 10,267,257 B2* | 4/2019 | Thomas | ................ | F02P 5/1506 |
| 10,794,353 B2* | 10/2020 | Kim | ......................... | H04W 4/02 |
| 10,838,474 B2* | 11/2020 | Niwa | ......................... | H02J 7/34 |
| 2002/0113441 A1* | 8/2002 | Obayashi | .............. | H02J 7/1423 |
| | | | | 290/40 C |
| 2005/0200201 A1* | 9/2005 | Jabaji | ..................... | H02J 7/0048 |
| | | | | 307/10.1 |
| 2011/0001352 A1* | 1/2011 | Tamura | ................... | B60L 58/20 |
| | | | | 307/9.1 |
| 2011/0207358 A1* | 8/2011 | Ichikawa | ................ | B60L 50/61 |
| | | | | 439/502 |
| 2011/0208410 A1* | 8/2011 | Izumoto | .................. | F02D 17/04 |
| | | | | 701/112 |
| 2015/0336523 A1 | 11/2015 | Okaniwa | | |

(Continued)

FOREIGN PATENT DOCUMENTS

| | | |
|---|---|---|
| JP | 2003-165406 A | 6/2003 |
| JP | 2015-217919 A | 12/2015 |

*Primary Examiner* — Adam D Houston
(74) *Attorney, Agent, or Firm* — McGinn IP Law Group, PLLC

(57) ABSTRACT

A vehicle power supply apparatus includes a power converter circuit, a power storage unit, and a processor. The power converter circuit converts a voltage of electric power received from a normal power supply of a vehicle configured to perform idle-stop operation, and supplies the converted electric power to vehicle loads of the vehicle. The power storage unit is coupled to the power converter circuit. The vehicle loads include a first vehicle load related to travel of the vehicle and a second vehicle load not related to the travel of the vehicle. At an end of the idle-stop operation, the processor supplies the converted electric power to one of the first vehicle load and the second vehicle load, and supplies electric power from the normal power supply to the other of the first vehicle load and the second vehicle load.

12 Claims, 8 Drawing Sheets

(56) References Cited

U.S. PATENT DOCUMENTS

| | | | |
|---|---|---|---|
| 2016/0059712 A1* | 3/2016 | Jang | H02J 7/342 |
| | | | 307/10.1 |
| 2016/0229362 A1* | 8/2016 | Brutus | H02K 7/1815 |
| 2018/0219407 A1* | 8/2018 | Nakamura | G01R 31/392 |
| 2018/0233943 A1* | 8/2018 | Koizumi | H02J 7/1423 |
| 2019/0337475 A1* | 11/2019 | Kawamura | H02J 1/001 |
| 2020/0099253 A1* | 3/2020 | Mizutani | H02J 13/0003 |
| 2021/0122376 A1* | 4/2021 | Ha | F02D 41/04 |

* cited by examiner

VEHICLE POWER SUPPLY APPARATUS

CROSS-REFERENCE TO RELATED APPLICATIONS

The present application claims priority from Japanese Patent Application No. 2020-126679 filed on Jul. 27, 2020, the entire contents of which are hereby incorporated by reference.

BACKGROUND

The technology relates to a vehicle power supply apparatus. For example, the technology relates to a vehicle power supply apparatus to be provided in a vehicle configured to perform idle-stop operation.

In recent years, vehicles with an engine include those configured to perform idle-stop operation. Existing vehicles have performed idling in which an engine is operated even at a stop. The idle-stop operation stops, for fuel economy and exhaust gas reduction, for example, unnecessary idling when the vehicle is at a stop.

The engine is restarted in causing the vehicle to make a start from an idle-stop state. Japanese Unexamined Patent Application Publication (JP-A) No. 2015-217919 discloses a technique of, at the engine restart, supplying electric power from a capacitor, for example, in addition to a main power supply, such as a battery.

JP-A No. 2003-165406 discloses a technique of classifying loads mountable on a vehicle into some groups, assigning priority to the groups, and selectively supplying electric power.

SUMMARY

An aspect of the technology provides a vehicle power supply apparatus including a power converter circuit, a power storage unit, and a processor. The power converter circuit is configured to convert a voltage of electric power received from a normal power supply of a vehicle, and to supply the converted electric power to vehicle loads of the vehicle. The vehicle is configured to perform idle-stop operation. The power storage unit is coupled to the power converter circuit. The vehicle loads include a first vehicle load related to travel of the vehicle and a second vehicle load not related to the travel of the vehicle. The processor is configured to, at an end of the idle-stop operation, supply the converted electric power to one of the first vehicle load and the second vehicle load, and supply electric power from the normal power supply to the other of the first vehicle load and the second vehicle load.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the technology.

DETAILED DESCRIPTION

Figure 1A:
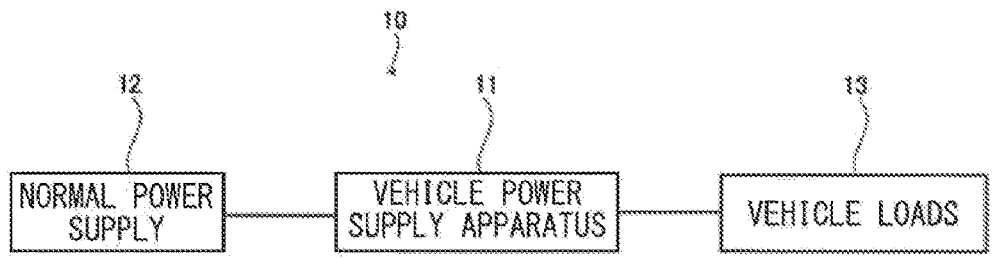
FIG. 1A is a block diagram illustrating a connection configuration of a vehicle including a vehicle power supply apparatus according to one example embodiment of the technology.

The technique disclosed in JP-A No. 2015-217919 supplies, when returning from the idle-stop state and restarting the engine, electric power to a load from an auxiliary power supply, such as a capacitor. However, JP-A No. 2015-217919 does not disclose a thorough study on an amount of the electric power supplied from the auxiliary power supply. If the amount of the electric power supplied to the load from the auxiliary power supply is insufficient, setting information for car navigation equipment, for example, can be reset inadvertently.

When an engine is restarted, efficiency of raising voltage by a DC-DC converter decreases due to a decrease in voltage of a vehicle main power supply, e.g., a lead battery. Thus, current flowing between the battery and an input of the DC-DC converter increases, which causes a voltage drop due to wiring resistance between the battery and the DC-DC converter. As a measure to address this, the wiring resistance may be reduced by increasing a diameter of a harness, but this measure makes routing of the harness difficult. The converter may be increased in capacity as another measure to address the voltage drop, but this can result in an increase in size of an apparatus or an increase in cost.

The technique disclosed in JP-A No. 2003-165406 classifies the loads mountable on the vehicle into some groups and assigns priority to the groups, but this technique merely shuts off electric power supply to a part of the groups upon occurrence of an accident. Therefore, this technique does not make it possible to guarantee operation of the loads when returning from an idle-stop state and restarting an engine.

It is desirable to provide a vehicle power supply apparatus that makes it possible to stabilize operation of a vehicle-mounted load with a small amount of electric power when restarting an engine from an idle-stop state.

In the following, a vehicle power supply apparatus 11 according to some example embodiments of the technology are described with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments that are not recited in a most-generic independent claim of the technology are optional and may be provided on an as-needed basis. The drawings are schematic and are not intended to be drawn to scale. Throughout the present specification and the drawings, elements having substantially the same function and configuration are denoted with the same numerals to avoid any redundant description.

Given below are examples of correspondence between the example embodiments and the appended claims. In one embodiment, a DC-DC converter 14 may serve as a "power converter circuit". In one embodiment, a capacitor 15 may serve as a "power storage unit". In one embodiment, a DC-DC control processor 161 may serve as a "processor". In one embodiment, a steering system load 131 and a braking system load 132 may serve as a "first vehicle load". In one embodiment, a display system load 134 may serve as a "second vehicle load". In one embodiment, an emergency system load 133 may serve as a "third vehicle load".

Figure 1B:
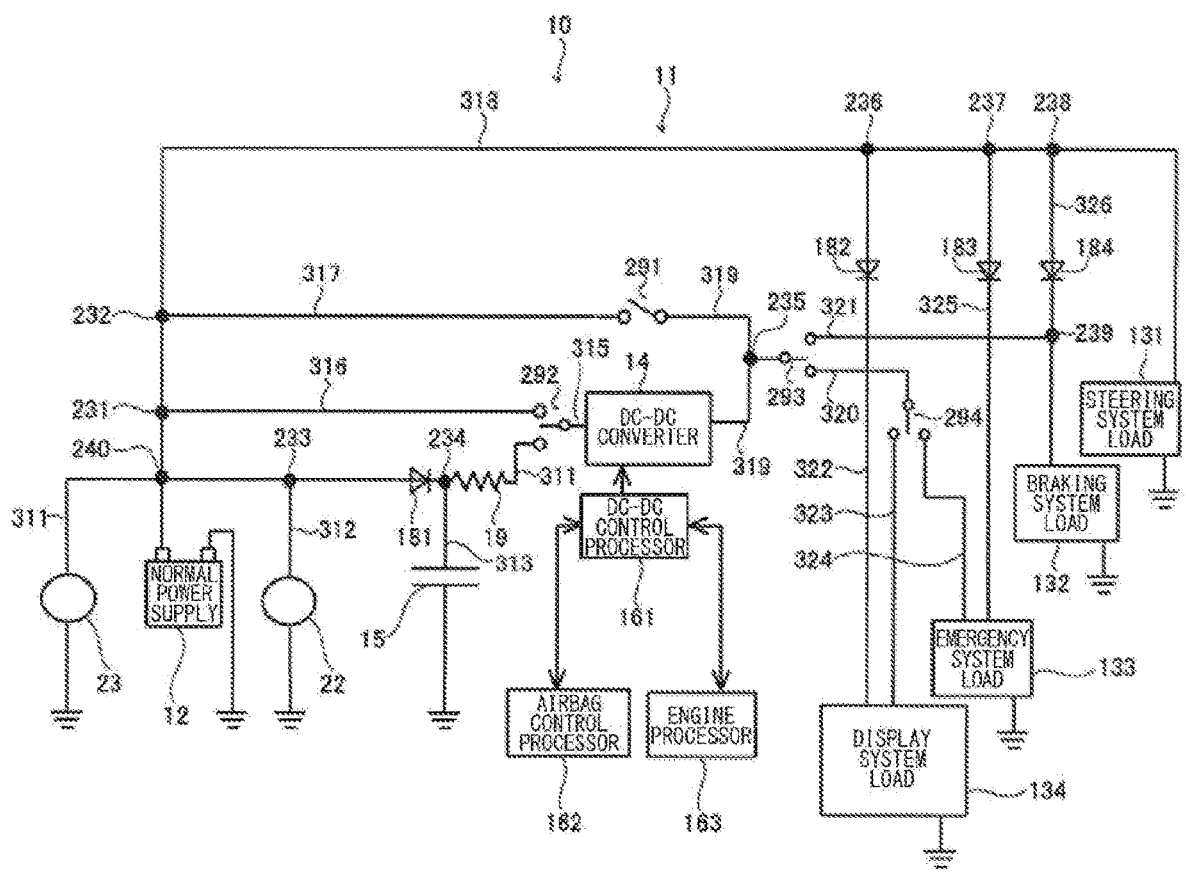
FIG. 1B is a circuit diagram illustrating the vehicle power supply apparatus according to one example embodiment of the technology.

A configuration of the vehicle power supply apparatus 11 is described with reference to FIGS. 1A and 1B. FIG. 1A is a block diagram illustrating an outline configuration of a vehicle 10 including the vehicle power supply apparatus 11. FIG. 1B is a circuit diagram illustrating a detailed configuration of the vehicle power supply apparatus 11.

Referring to FIG. 1A, the vehicle 10 may include a normal power supply 12, the vehicle power supply apparatus 11, and vehicle loads 13. The vehicle 10 may be a vehicle that travels by using an unillustrated engine as a drive source. The vehicle 10 may be configured to perform idle-stop operation. The idle-stop operation may refer to operation of stopping unnecessary idling when the vehicle 10 makes a stop at an intersection or another place, for fuel economy and exhaust gas reduction, for example.

The normal power supply 12 may supply electric power to the vehicle loads 13. The normal power supply 12 may be a rechargeable lead-acid battery or lithium ion battery that generates direct-current electric power of 12V, for example.

The vehicle loads 13 may be loads mountable on the vehicle 10. The vehicle loads 13 will be described in detail later with reference to FIG. 1B.

The vehicle power supply apparatus 11 may convert the electric power supplied from the normal power supply 12 to the vehicle loads 13. The vehicle power supply apparatus 11 will be described in detail later with reference to FIG. 1B.

A circuit configuration of the vehicle power supply apparatus 11 is described with reference to FIG. 1B. In the vehicle 10 configured to perform the idle-stop operation, the vehicle power supply apparatus 11 may convert the electric power supplied from the normal power supply 12 to the vehicle loads 13. The vehicle power supply apparatus 11 mainly includes the DC-DC converter 14, the capacitor 15, and the DC-DC control processor 161. The DC-DC converter 14 converts a voltage of the electric power received from the normal power supply 12. The capacitor 15 is coupled to the DC-DC converter 14.

The vehicle loads 13 mentioned above include a first vehicle load related to travel of the vehicle 10 and a second vehicle load not directly related to the travel of the vehicle 10. The first vehicle load may be the steering system load 131 and the braking system load 132 to be described later. The second vehicle load may be the display system load 134 to be described later. At the end of the idle-stop operation, the DC-DC control processor 161 supplies the electric power converted by the DC-DC converter 14 to one of the first vehicle load and the second vehicle load, and supplies the electric power from the normal power supply 12 to the other of the first vehicle load and the second vehicle load. This will be described later.

As an example configuration, the vehicle power supply apparatus 11 may mainly include the capacitor 15, the DC-DC converter 14, a circuit switching unit 291, a circuit switching unit 292, a circuit switching unit 293, and a circuit switching unit 294. FIG. 1B illustrates, as the vehicle loads 13, the steering system load 131, the braking system load 132, the emergency system load 133, and the display system load 134.

The example configuration of the vehicle power supply apparatus 11 is described in detail, together with the normal power supply 12 and the vehicle loads 13.

One electrode of the normal power supply 12 may be grounded, and the other electrode of the normal power supply 12 may be coupled to the steering system load 131 through a connection line 318.

One electrode of an alternator 23 may be grounded, and the other electrode of the alternator 23 may be coupled to the circuit switching unit 292 through a connection line 311. To the connection line 311 may be coupled a diode 181 and a resistor 19. The diode 181 may be closer to the alternator 23 than the resistor 19 is. The alternator 23 may be driven by the unillustrated engine.

A starter 22 may be a starter motor configured to convert electric power supplied from the normal power supply 12 into rotational energy, thereby rotating the engine to a level that allows autonomous operation. One electrode of the starter 22 may be grounded, and the other electrode of the starter 22 may be coupled to a contact 233 of the connection line 311 via a connection line 312.

One electrode of the capacitor 15 may be grounded, and the other electrode of the capacitor 15 may be coupled to a contact 234 of the connection line 311 via a connection line 313. The contact 234 may be disposed between the diode 181 and the resistor 19.

The DC-DC control processor 161 may be a device that controls overall operation of the vehicle power supply apparatus 11. For example, an electronic control unit (ECU) may be used as the DC-DC control processor 161.

An airbag control processor 162 may be an ECU that controls deployment of an airbag. In the example embodiment, the airbag control processor 162 may transmit, to the DC-DC control processor 161, an electric signal indicating deployment of the airbag, i.e., occurrence of vehicle collision.

An engine processor 163 may be an ECU that controls operation of the engine. The engine processor 163 may transmit, to the DC-DC control processor 161, an electric signal indicating that the engine is to be restarted when the idle-stop ends.

As the DC-DC converter 14, a boost converter may be used in the example embodiment. The DC-DC converter 14 may be a circuit element that raises and stabilizes electric power supplied from the normal power supply 12. The DC-DC converter 14 may have an input electrode coupled to a connection line 315 and an output electrode coupled to a connection line 319.

The steering system load 131 may be a load that steers the vehicle 10. The steering system load 131 may steer the vehicle 10 on the basis of an amount of an occupant's operation on a steering wheel. The steering system load 131 may also be referred to as a power steering system. One electrode of the steering system load 131 may be grounded, and the other electrode of the steering system load 131 may be coupled to the normal power supply 12 via the connection line 318.

The braking system load 132 may be a load that brakes the vehicle 10. The braking system load 132 may brake the vehicle 10 on the basis of an amount of depression on a brake pedal by the occupant. One electrode of the braking system load 132 may be grounded, and the other electrode of the braking system load 132 may be coupled to the connection line 318 via a connection line 326 and a contact 238. For example, a brake assist system, an antilock brake system (ABS), or a vehicle dynamics control (VDC) system may be used as the braking system load 132.

The emergency system load 133 may be a load related to emergency operation of the vehicle 10. For example, the emergency system load 133 may be a door lock mechanism or an emergency notification system. One electrode of the emergency system load 133 may be grounded. The other electrode of the emergency system load 133 may be coupled to the normal power supply 12 via a connection line 325, a contact 237, and the connection line 318. The other electrode of the emergency system load 133 may also be coupled to the circuit switching unit 294 via a connection line 324.

The display system load 134 may be equipment not directly related to the travel of the vehicle 10, in comparison with the steering system load 131 and the braking system load 132. The display system load 134 may be, for example, a display, car navigation equipment, an audio, or a meter. One electrode of the display system load 134 may be grounded, and the other electrode of the display system load 134 may be coupled to the circuit switching unit 294 through a connection line 323. The other electrode of the display system load 134 may also be coupled to a contact 236 through a connection line 322.

A connection line 316 may couple a contact 231 of the connection line 318 to the circuit switching unit 292. A connection line 317 may couple a contact 232 of the connection line 318 to the circuit switching unit 291. A connection line 321 may couple a contact 239 of the connection line 326 to the circuit switching unit 293. The connection line 311 and the connection line 318 may be coupled together at a contact 240.

The circuit switching unit 291 may be a switching device installed between the connection line 317 and the connection line 319. For example, a semiconductor device, such as a transistor, may be used as the circuit switching unit 291. The circuit switching unit 291 may couple the connection line 317 and the connection line 319 together, on the basis of an instruction from the DC-DC control processor 161.

The circuit switching unit 292 may be a switching device disposed between the connection line 315, the connection line 311, and the connection line 316. For example, a semiconductor device, such as a transistor, may be used as the circuit switching unit 292. The circuit switching unit 292 may couple the connection line 311 and the connection line 315 together, or the connection line 316 and the connection line 315 together, on the basis of an instruction from the DC-DC control processor 161.

The circuit switching unit 293 may be a switching device disposed between a contact 235, the connection line 321, and a connection line 320. For example, a semiconductor device, such as a transistor, may be used as the circuit switching unit 293. The circuit switching unit 293 may couple the contact 235 and the connection line 321 together, or the contact 235 and the connection line 320 together, on the basis of an instruction from the DC-DC control processor 161.

The circuit switching unit 294 may be a switching device disposed between the connection line 320, the connection line 324, and the connection line 323. For example, a semiconductor device, such as a transistor, may be used as the circuit switching unit 294. The circuit switching unit 294 may couple the connection line 320 and the connection line 324 together, or the connection line 320 and the connection line 323 together, on the basis of an instruction from the DC-DC control processor 161.

A diode 182 may be installed at an intermediate part of the connection line 322. A diode 183 may be installed at an intermediate part of the connection line 325. A diode 184 may be installed at an intermediate part of the connection line 326.

Figure 2:
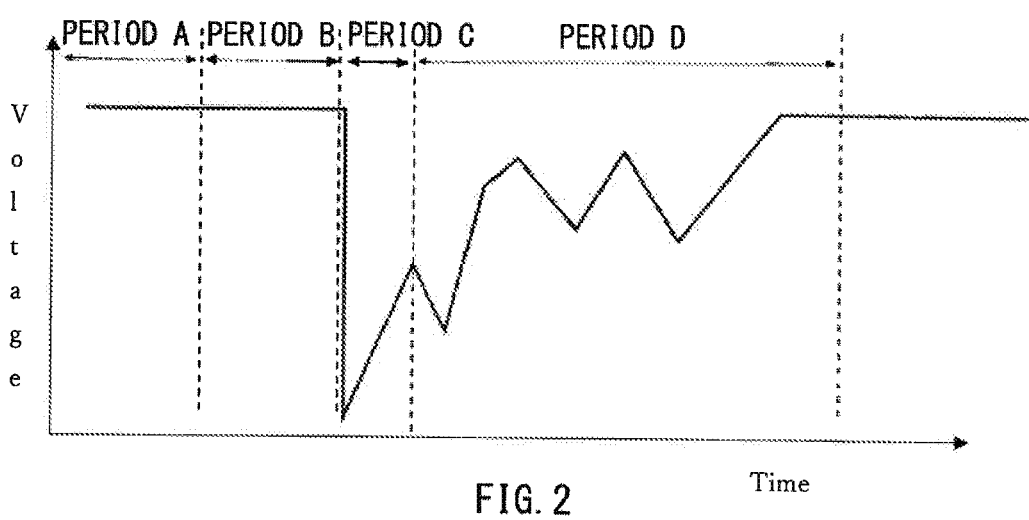
FIG. 2 is a timing chart illustrating a change in power supply voltage in each period in a case of restarting an engine in the vehicle power supply apparatus according to one example embodiment of the technology.

Referring to FIG. 2, a period from the idle-stop to the engine restart of the vehicle configured to perform the idle-stop operation may be divided into a period A, a period B, a period C, and a period D. FIG. 2 is a chart illustrating a voltage value of the normal power supply 12.

The period A may be a period in which the DC-DC converter 14 is not in operation. In the period A, the voltage of the normal power supply 12 may be stable at about 12V, for example.

The period B may be a period immediately before restarting the engine from an idle-stop state.

The period C may be a period including when and immediately after the engine is restarted.

The period D may be a period until the voltage recovers after the end of the period C.

A behavior of the vehicle power supply apparatus 11 in the period B, the period C, and the period D may differ between a case of restarting the engine from the idle-stop state while the vehicle 10 is at a stop, and a case of restarting the engine from the idle-stop state while the vehicle 10 is traveling. FIGS. 4A and 4B and FIGS. 5A and 5B illustrate the case of restarting the engine from the idle-stop state while the vehicle 10 is at a stop. FIGS. 6A and 6B and FIGS. 7A and 7B illustrate the case of restarting the engine from the idle-stop state while the vehicle 10 is traveling. Note that a behavior of the vehicle power supply apparatus 11 in the period A may be similar between the case of restarting the engine from the idle-stop state while the vehicle 10 is at a stop, and the case of restarting the engine from the idle-stop state while the vehicle 10 is traveling.

Figure 3A:
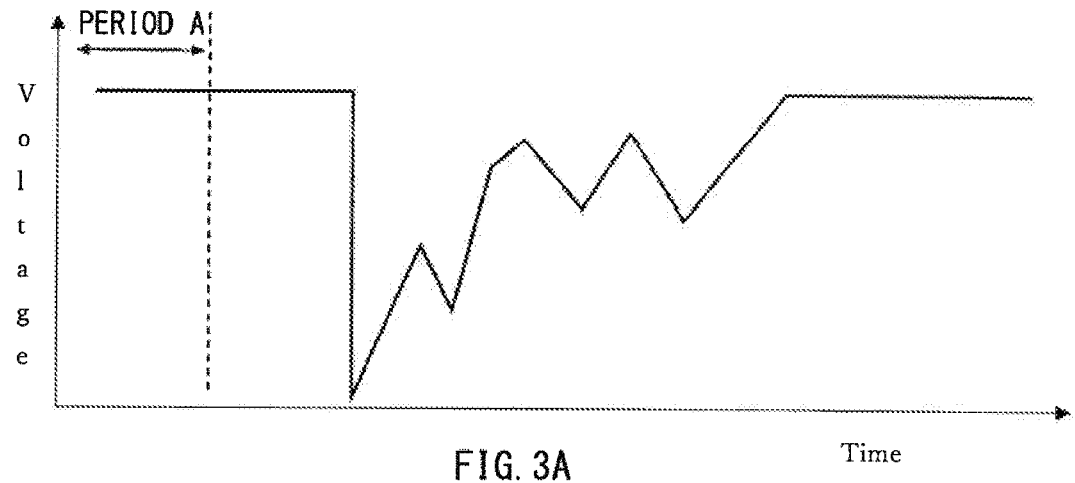
FIG. 3A is a timing chart illustrating a change in power supply voltage in a period A in the case of restarting the engine in the vehicle power supply apparatus according to one example embodiment of the technology.
Figure 3B:
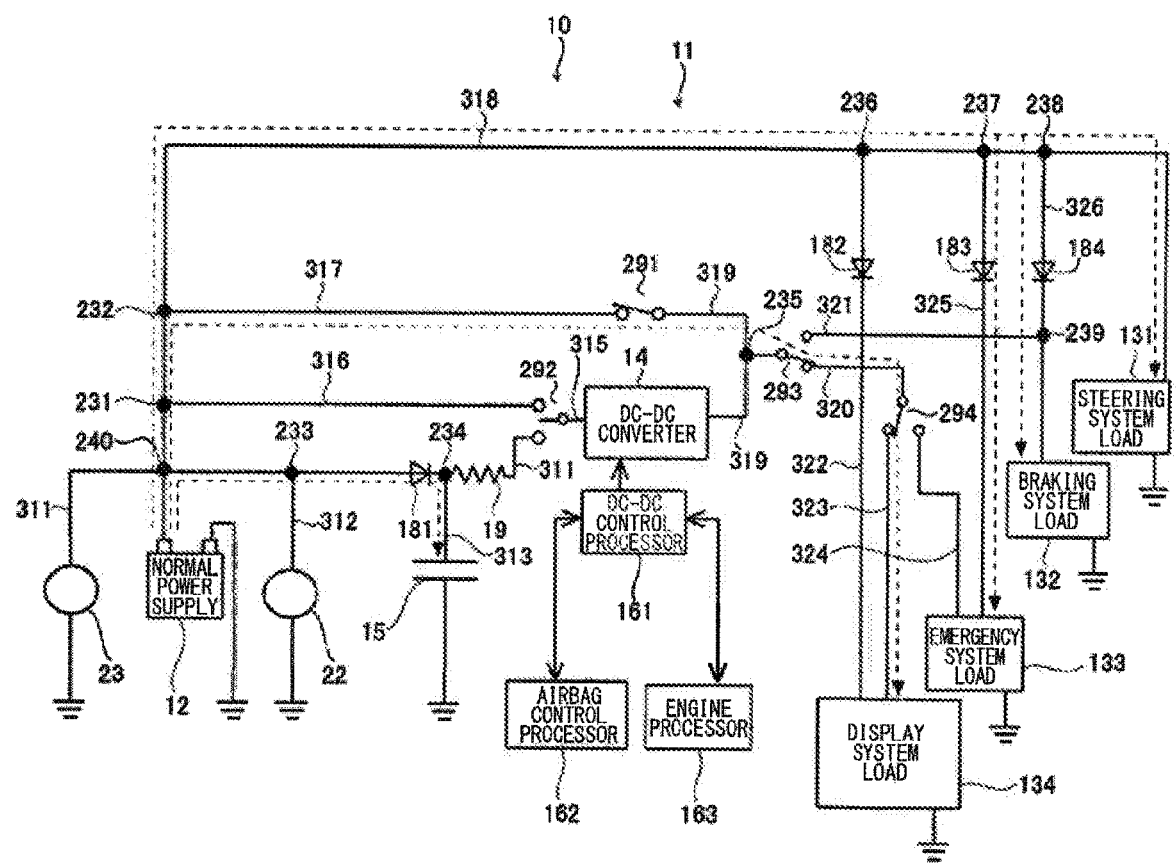
FIG. 3B is a circuit diagram illustrating operation of the vehicle power supply apparatus according to one example embodiment of the technology in the period A.

With reference to FIGS. 3A and 3B, description is given on operation of the vehicle power supply apparatus 11 in the period A in a case where the vehicle 10 is at a stop. Current flows are indicated by dashed lines. FIG. 3A is a chart illustrating the period A, and FIG. 3B is a circuit diagram illustrating the operation of the vehicle power supply apparatus 11 in the period A.

Referring to FIG. 3A, in the period A, the voltage of the normal power supply 12 may be stable at about 12V, for example.

Referring to FIG. 3B, in the period A, the circuit switching unit 291 may be in a conducting state. The circuit switching unit 292 may be in a non-conducting state. The circuit switching unit 293 may couple the contact 235 and the connection line 320 together. The circuit switching unit 294 may couple the connection line 320 and the connection line 323 together.

Thus, the electric power from the normal power supply 12 may be supplied to the steering system load 131 via the connection line 318. The electric power from the normal power supply 12 may also be stored in the capacitor 15 via the connection line 318, the contact 240, the connection line 311, the contact 234, and the connection line 313.

In addition, the electric power from the normal power supply 12 may be supplied to the braking system load 132 via the connection line 318, the contact 238, and the connection line 326.

The electric power from the normal power supply 12 may also be supplied to the emergency system load 133 via the connection line 318, the contact 237, and the connection line 325.

In addition, the electric power from the normal power supply 12 may be supplied to the display system load 134 via the connection line 318, the contact 232, the connection line 317, the circuit switching unit 291, the connection line 319, the contact 235, the circuit switching unit 293, the connection line 320, the circuit switching unit 294, and the connection line 323.

Operating the vehicle power supply apparatus 11 as described above enables stable electric power from the normal power supply 12 to be supplied to the steering system load 131, the braking system load 132, the emergency system load 133, and the display system load 134, making it possible to operate these loads stably.

With reference to FIGS. 4A and 4B and FIGS. 5A and 5B, description is given on operation of the vehicle power supply apparatus 11 in a case of restarting the engine from the idle-stop state while the vehicle 10 is at a stop.

Figure 4A:
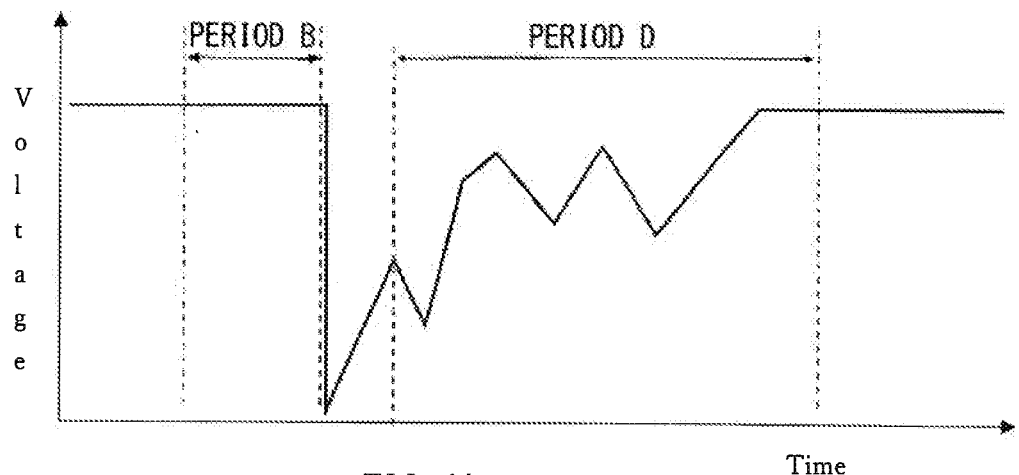
FIG. 4A is a timing chart illustrating a change in power supply voltage in a period B and a period D in the case of restarting the engine in the vehicle power supply apparatus according to one example embodiment of the technology while the vehicle is at a stop.
Figure 4B:
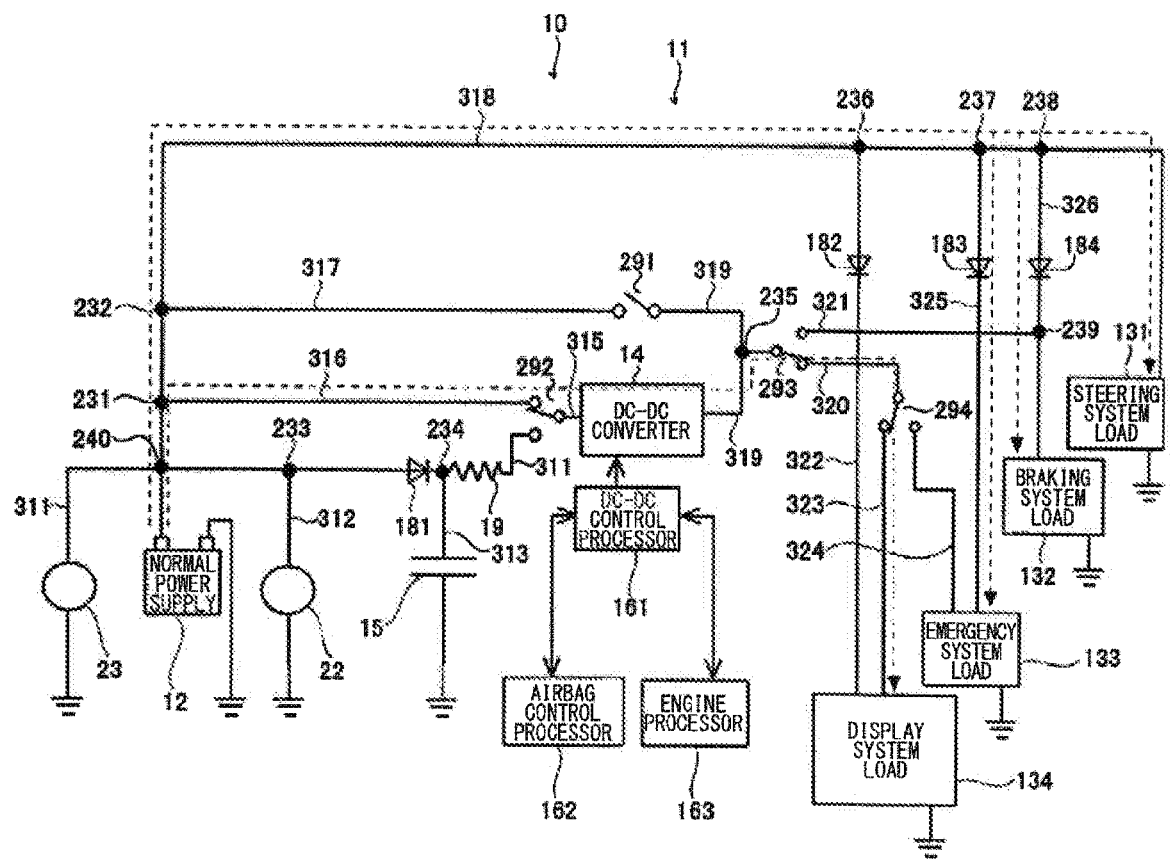
FIG. 4B is a circuit diagram illustrating operation of the vehicle power supply apparatus according to one example embodiment of the technology in the period B and the period D while the vehicle is at a stop.

With reference to FIGS. 4A and 4B, description is given on operation of the vehicle power supply apparatus 11 in the period B and the period D. The period B may be the period immediately before restarting the engine from the idle-stop state. The period D may be the period in which the vehicle 10 is caused to travel by driving force of the engine after the end of the idle-stop operation. FIG. 4A is a chart illustrating the period B and the period D, and FIG. 4B is a circuit diagram illustrating the operation of the vehicle power supply apparatus 11 in the period B and the period D.

Referring to FIG. 4A, in the period B, the voltage of the normal power supply 12 may be relatively stable at about 12V, for example. The period B may be, for example, in a period during which the engine is stopped by the idle-stop operation, a period until the engine is restarted after the occupant takes his/her foot off the brake pedal. In the period B, a voltage drop at the normal power supply 12 has not occurred yet. The period D may be the period until the voltage recovers after the end of the period C described above.

Referring to FIG. 4B, in the period B and the period D, the circuit switching unit 291 may be in a non-conducting state. The circuit switching unit 292 may couple the connection line 315 and the connection line 316 together. The circuit switching unit 293 may couple the contact 235 and the connection line 320 together. The circuit switching unit 294 may couple the connection line 320 and the connection line 323 together.

Thus, the electric power from the normal power supply 12 may be supplied to the DC-DC converter 14 via the connection line 318, the contact 231, the connection line 316, the circuit switching unit 292, and the connection line 315. Thereafter, the electric power stabilized at a predetermined voltage value by the DC-DC converter 14 may be supplied to the display system load 134 via the connection line 319, the contact 235, the circuit switching unit 293, the connection line 320, the circuit switching unit 294, and the connection line 323.

The electric power from the normal power supply 12 may also be supplied to the steering system load 131 via the connection line 318.

In addition, the electric power from the normal power supply 12 may be supplied to the braking system load 132 via the connection line 318, the contact 238, and the connection line 326. The electric power from the normal power supply 12 may also be supplied to the emergency system load 133 via the connection line 318, the contact 237, and the connection line 325.

This makes it possible to supply electric power whose voltage is stabilized by the DC-DC converter 14 to the display system load 134 that is car navigation equipment, for example. This helps to suppress flicker, for example, on the display system load 134.

Figure 5A:
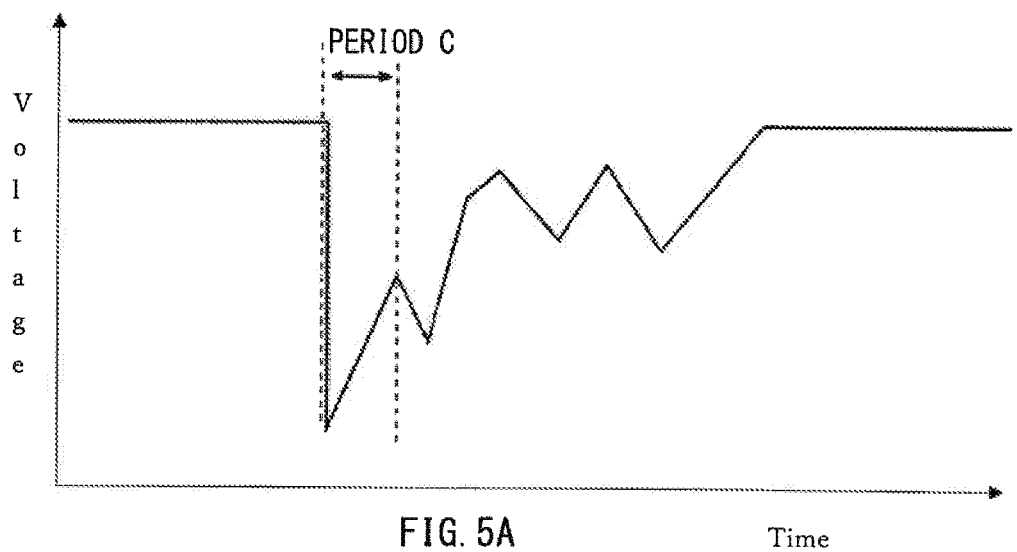
FIG. 5A is a timing chart illustrating a change in power supply voltage in a period C in the case of restarting the engine in the vehicle power supply apparatus according to one example embodiment of the technology while the vehicle is at a stop.
Figure 5B:
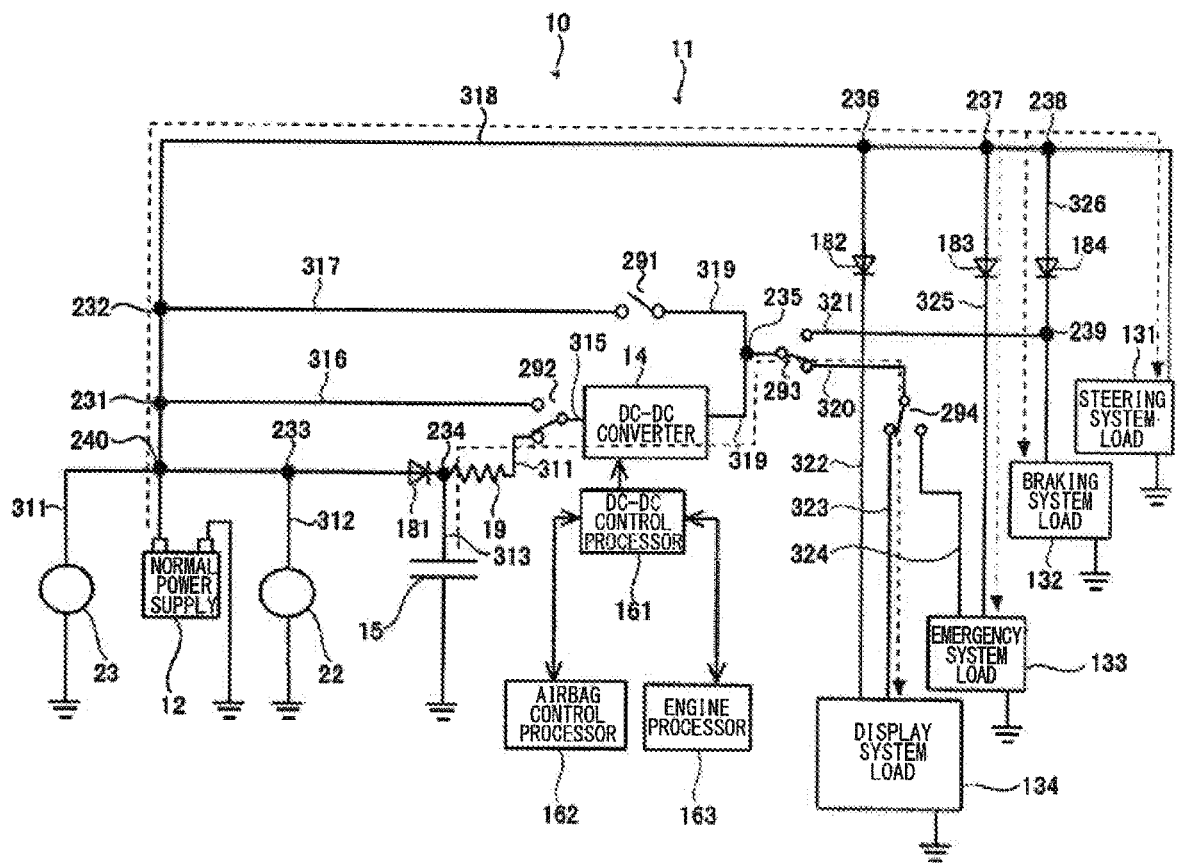
FIG. 5B is a circuit diagram illustrating operation of the vehicle power supply apparatus according to one example embodiment of the technology in the period C while the vehicle is at a stop.

With reference to FIGS. 5A and 5B, description is given on operation of the vehicle power supply apparatus 11 in the period C in a case where the vehicle 10 is at a stop. The period C may include when and immediately after the engine is restarted. FIG. 5A is a chart illustrating the period C, and FIG. 5B is a circuit diagram illustrating the operation of the vehicle power supply apparatus 11 in the period C.

Referring to FIG. 5A, in the period C, a voltage decrease may be caused by a voltage drop due to wiring resistance and by electric power being consumed by the starter 22 that restarts the engine, for example.

Referring to FIG. 5B, in the period C, the circuit switching unit 291 may be in a non-conducting state. The circuit switching unit 292 may couple the connection line 315 and the connection line 311 together. The circuit switching unit 293 may couple the contact 235 and the connection line 320 together. The circuit switching unit 294 may couple the connection line 320 and the connection line 323 together Thus, electric power from the capacitor 15 may be supplied to the DC-DC converter 14 via the connection line 313, the contact 234, the resistor 19, the connection line 311, the circuit switching unit 292, and the connection line 315. Thereafter, the electric power stabilized at the predetermined voltage value by the DC-DC converter 14 may be supplied to the display system load 134 via the connection line 319, the contact 235, the circuit switching unit 293, the connection line 320, the circuit switching unit 294, and the connection line 323.

The electric power from the normal power supply 12 may also be supplied to the steering system load 131 via the connection line 318. In addition, the electric power from the normal power supply 12 may be supplied to the braking system load 132 via the connection line 318, the contact 238, and the connection line 326. The electric power from the normal power supply 12 may also be supplied to the emergency system load 133 via the connection line 318, the contact 237, and the connection line 325.

This makes it possible to supply the electric power supplied from the capacitor 15 and whose voltage is stabilized by the DC-DC converter 14 to the display system load 134 that is car navigation equipment, for example. This helps to suppress discontinuous operation, for example, flicker, on the display system load 134.

With reference to FIGS. 6A and 6B and FIGS. 7A and 7B, description is given on operation of the vehicle power supply apparatus 11 in a case of restarting the engine from the idle-stop state while the vehicle 10 is traveling.

Description is given on "change of mind" of restarting the engine from the idle-stop state while the vehicle 10 is traveling. In recent years, idle-stop before stopping is performed in some cases to enhance an effect of fuel economy improvement achieved by the idle-stop. The idle-stop before stopping may refer to stopping the engine when a vehicle speed becomes a predetermined speed or less. In such a case, the occupant may step on an accelerator pedal for acceleration again before the vehicle speed becomes the predetermined speed or less and the vehicle stops. Such a phenomenon may also be referred to as change of mind. In a case of the change of mind, the vehicle power supply apparatus 11 may be operated as follows to stably operate the load related to the travel of the vehicle 10.

Figure 6A:
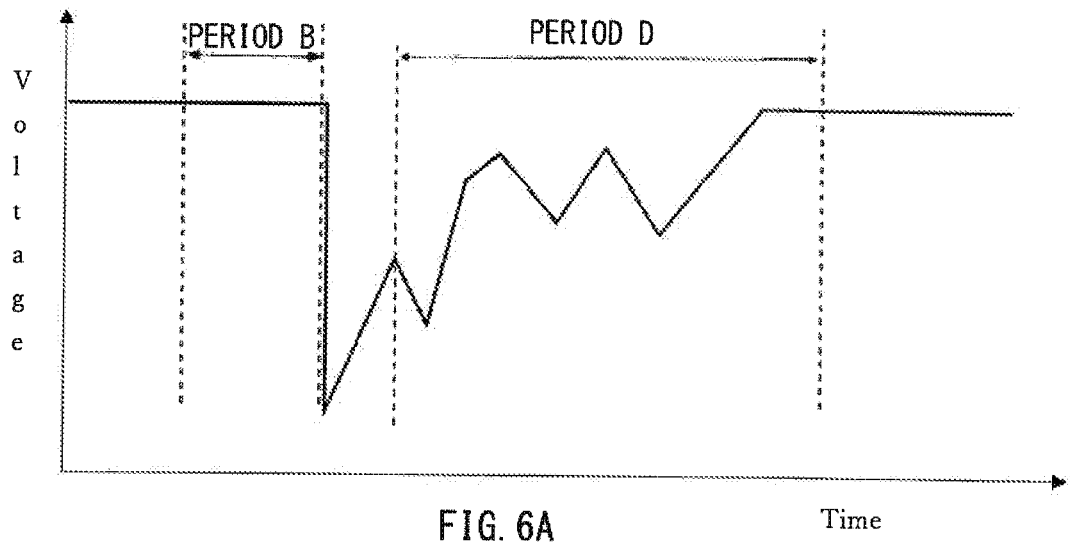
FIG. 6A is a timing chart illustrating a change in power supply voltage in the period B and the period D in the case of restarting the engine in the vehicle power supply apparatus according to one example embodiment of the technology while the vehicle is traveling.
Figure 6B:
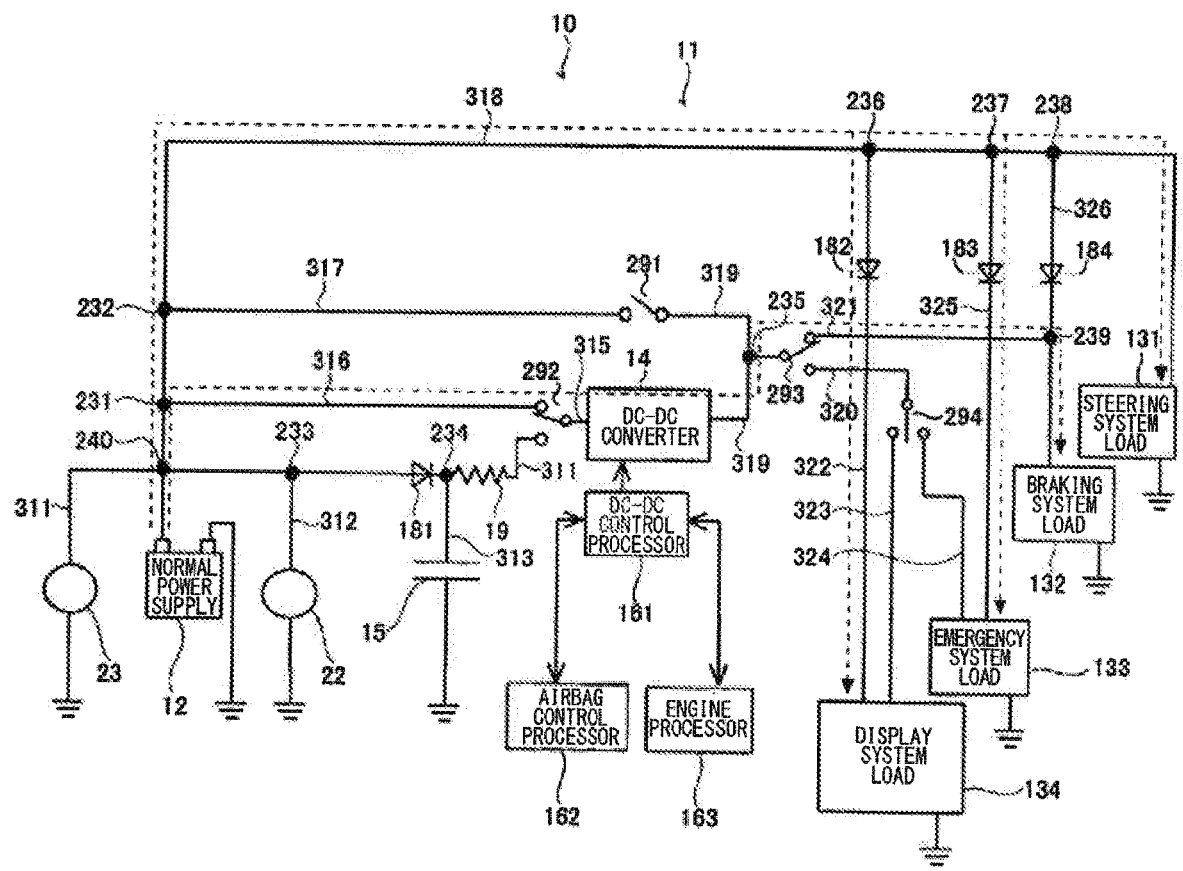
FIG. 6B is a circuit diagram illustrating operation of the vehicle power supply apparatus according to one example embodiment of the technology in the period B and the period D while the vehicle is traveling.

With reference to FIGS. 6A and 6B, description is given on operation of the vehicle power supply apparatus 11 in the period B and the period D when the vehicle is traveling. The period B may be the period immediately before restarting the engine from the idle-stop state. The period D may be the period in which the vehicle 10 is caused to travel by driving force of the engine after the end of the idle-stop operation. FIG. 6A is a chart illustrating the period B and the period D, and FIG. 6B is a circuit diagram illustrating the operation of the vehicle power supply apparatus 11 in the period B and the period D.

Referring to FIG. 6A, in the period B, the voltage of the normal power supply 12 may be relatively stable at about 12V, for example. In the period D, the voltage of the normal power supply 12 may recover to about 12V, for example.

Referring to FIG. 6B, in the period B and the period D, the circuit switching unit 291 may be in a non-conducting state. The circuit switching unit 292 may couple the connection line 315 and the connection line 316 together. The circuit switching unit 293 may couple the contact 235 and the connection line 321 together. The circuit switching unit 294 may be in a non-conducting state.

Thus, the electric power from the normal power supply 12 may be supplied to the DC-DC converter 14 via the connection line 318, the contact 231, the connection line 316, the circuit switching unit 292, and the connection line 315. Thereafter, the electric power stabilized at the predetermined voltage value by the DC-DC converter 14 may be supplied to the braking system load 132 via the connection line 319, the contact 235, the circuit switching unit 293, the connection line 321, the contact 239, and the connection line 326.

The electric power from the normal power supply 12 may also be supplied to the steering system load 131 via the connection line 318.

The electric power from the normal power supply 12 may also be supplied to the emergency system load 133 via the connection line 318, the contact 237, and the connection line 325.

In addition, the electric power from the normal power supply 12 may be supplied to the display system load 134 via the connection line 318, the contact 236, and the connection line 322.

This makes it possible to supply electric power whose voltage is stabilized by the DC-DC converter 14 to the braking system load 132. This helps to stably activate the braking system load 132 in a case of braking the vehicle 10 after the change of mind is performed.

Figure 7A:
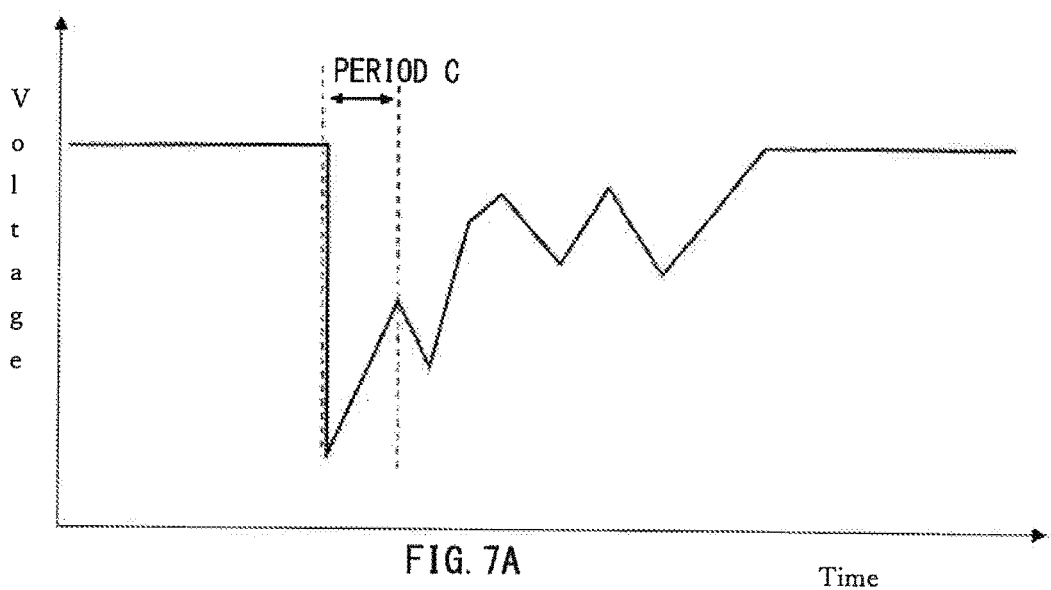
FIG. 7A is a timing chart illustrating a change in power supply voltage in the period C in the case of restarting the engine in the vehicle power supply apparatus according to one example embodiment of the technology while the vehicle is traveling.
Figure 7B:
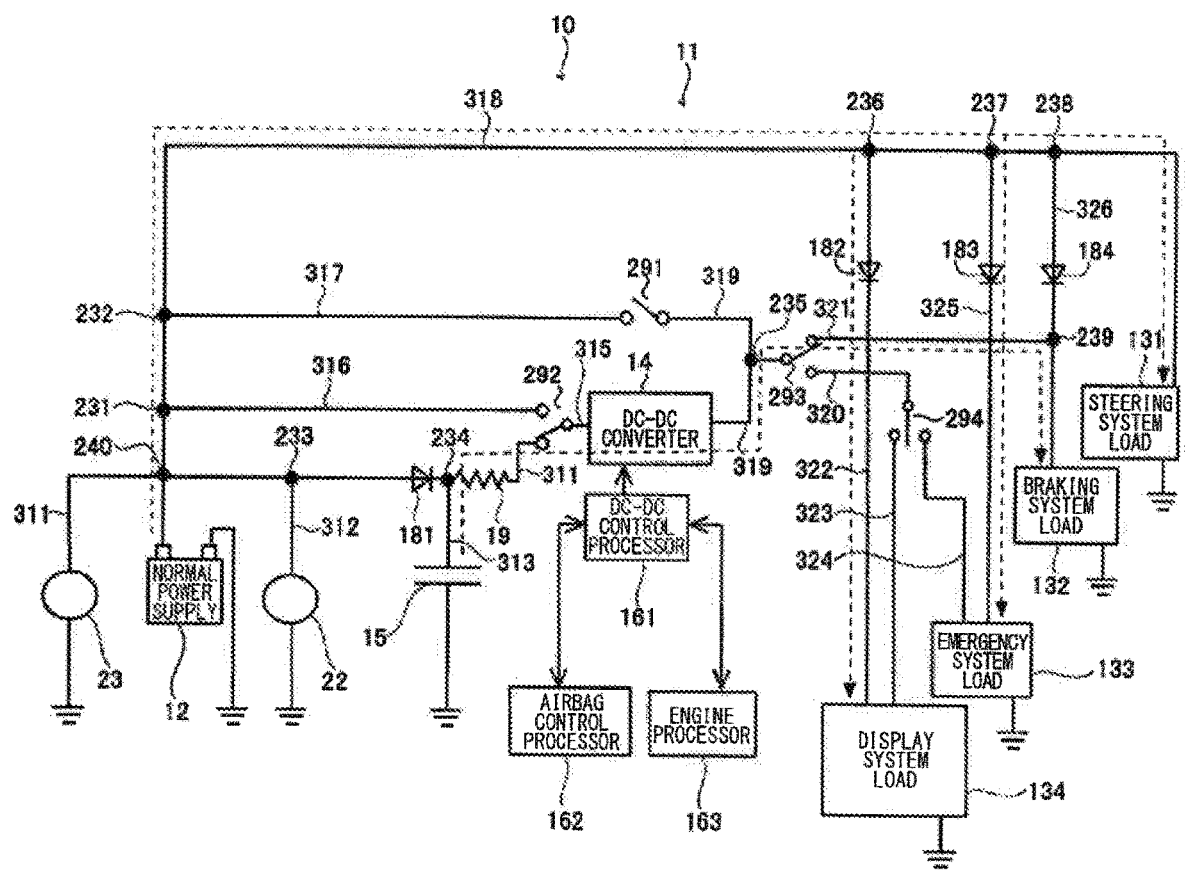
FIG. 7B is a circuit diagram illustrating operation of the vehicle power supply apparatus according to one example embodiment of the technology in the period C while the vehicle is traveling.

With reference to FIGS. 7A and 7B, description is given on operation of the vehicle power supply apparatus 11 in the period C when the vehicle is traveling. The period C may include when and immediately after the engine is restarted. FIG. 7A is a chart illustrating the period C, and FIG. 7B is a circuit diagram illustrating the operation of the vehicle power supply apparatus 11 in the period C.

Referring to FIG. 7A, in the period C, a voltage decrease may be caused by a voltage drop due to wiring resistance and by electric power being consumed by the starter 22, e.g., a self-starting motor, that restarts the engine, for example.

Referring to FIG. 7B, in the period C, the circuit switching unit 291 may be in a non-conducting state. The circuit switching unit 292 may couple the connection line 315 and the connection line 311 together. The circuit switching unit 293 may couple the contact 235 and the connection line 321 together. The circuit switching unit 294 may be in a non-conducting state.

Thus, the electric power from the capacitor 15 may be supplied to the DC-DC converter 14 via the connection line 313, the resistor 19, the connection line 311, the circuit switching unit 292, and the connection line 315. Thereafter, the electric power stabilized at the predetermined voltage value by the DC-DC converter 14 may be supplied to the braking system load 132 via the connection line 319, the contact 235, the circuit switching unit 293, the connection line 321, the contact 239, and the connection line 326.

The electric power from the normal power supply 12 may also be supplied to the steering system load 131 via the connection line 318. In addition, the electric power from the normal power supply 12 may be supplied to the emergency system load 133 via the connection line 318, the contact 237, and the connection line 325. The electric power from the normal power supply 12 may also be supplied to the display system load 134 via the connection line 318, the contact 236, and the connection line 322.

This makes it possible to supply the electric power supplied from the capacitor 15 and whose voltage is stabilized by the DC-DC converter 14 to the braking system load 132. This helps to reliably perform braking operation of the vehicle 10 in a case of the change of mind described above.

Figure 8:
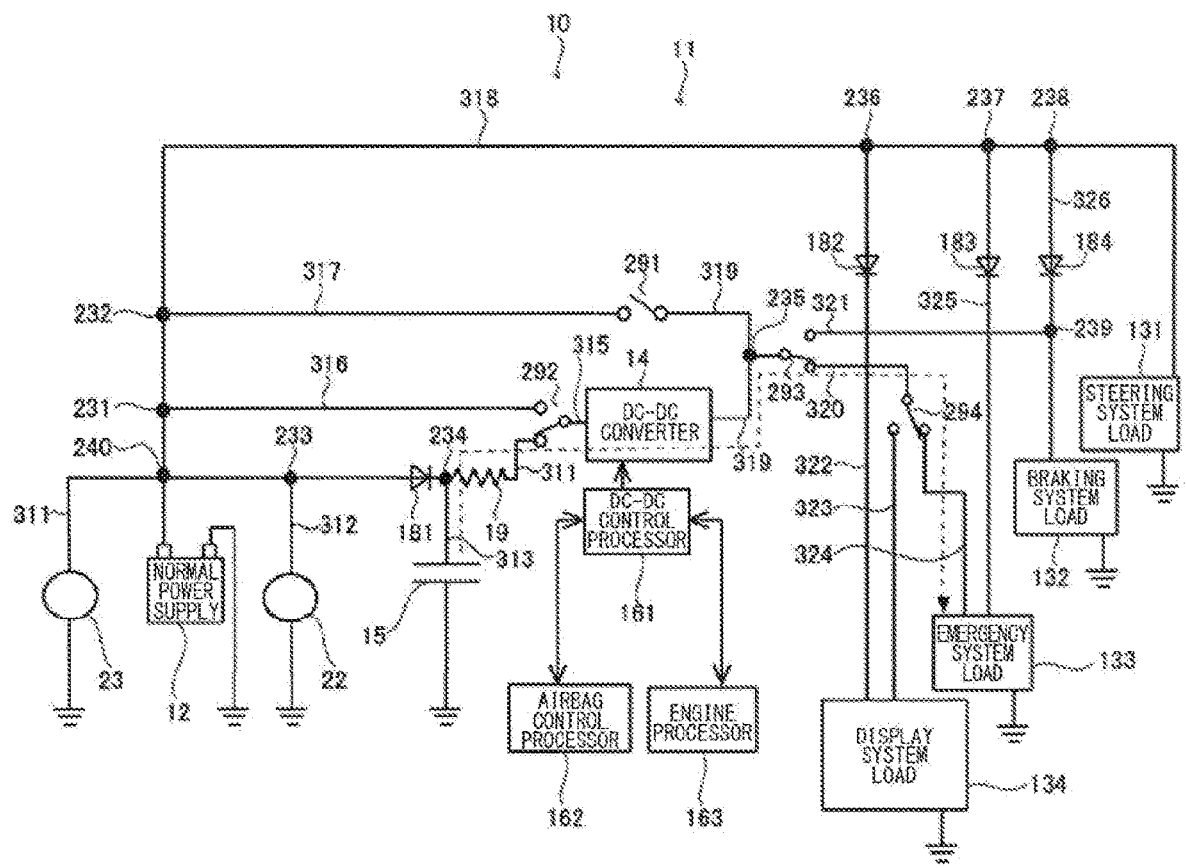
FIG. 8 is a circuit diagram illustrating operation of the vehicle power supply apparatus according to one example embodiment of the technology in an emergency case.

FIG. 8 is a circuit diagram illustrating operation of the vehicle power supply apparatus 11 in emergency, e.g., when the vehicle 10 is involved in a collision accident. In a case where the vehicle 10 is involved in a collision accident, the circuit switching unit 291 may be in a non-conducting state. The circuit switching unit 292 may couple the connection line 315 and the connection line 311 together. The circuit switching unit 293 may couple the contact 235 and the connection line 320 together. The circuit switching unit 294 may couple the connection line 320 and the connection line 324 together.

Thus, even if the normal power supply 12 is damaged by the vehicle 10 being involved in the collision accident and electric power supply from the normal power supply 12 stops, it is possible to supply electric power to the emergency system load 133 from the capacitor 15, on the basis of an instruction from the DC-DC control processor 161 that has received a detection signal from the airbag control processor 162. In one example, the electric power from the capacitor 15 may be supplied to the emergency system load 133 via the connection line 313, the contact 234, the resistor 19, the connection line 311, the circuit switching unit 292, the connection line 315, the DC-DC converter 14, the connection line 319, the contact 235, the circuit switching unit 293, the connection line 320, the circuit switching unit 294, and the connection line 324.

Thus, even in a case where no power is fed from the normal power supply 12 due to the collision accident, electric power is supplied from the capacitor 15. This makes it possible to stably operate the emergency system load 133 that is a door lock mechanism, for example, thereby unlocking a door to allow the occupant to escape to the outside of the vehicle.

According to the example embodiments described above, example effects described below are achievable.

The vehicle power supply apparatus 11 according to the example embodiment classifies the vehicle loads 13 into the first vehicle load (e.g., the steering system load 131) and the second vehicle load (e.g., the display system load 134). The first vehicle load is a load related to the travel of the vehicle 10. The second vehicle load is a load not related to the travel of the vehicle 10. At the end of the idle-stop operation, the vehicle power supply apparatus 11 supplies the electric power from one of the normal power supply 12 and the DC-DC converter 14 to the first vehicle load, and supplies the electric power from the other to the second vehicle load. This makes it possible to supply electric power with stable voltage supplied from the DC-DC converter 14 to either one of the first vehicle load and the second vehicle load. Accordingly, in a case of supplying the electric power from the DC-DC converter 14 to the first vehicle load, it is possible to stably activate a system related to the travel of the vehicle 10. In a case of supplying the electric power from the DC-DC converter 14 to the second vehicle load, it is possible to stably activate a system not related to the travel of the vehicle 10, for example, display equipment. In addition, classifying the loads and supplying electric power whose voltage is raised by the DC-DC converter 14 to a part of the loads makes it possible to simplify the DC-DC converter 14 in capacity and configuration.

In some example embodiments, in a case where the vehicle 10 is at a stop, the vehicle power supply apparatus 11 may, at the end of the idle-stop operation, supply the electric power converted by the DC-DC converter 14 to the second vehicle load, and thereafter may, when restarting the engine, supply the electric power from the capacitor 15 to the second vehicle load. This makes it possible to supply, at the end of the idle-stop operation, stable electric power to the second vehicle load, e.g., the display system load 134, which helps to stably operate the second vehicle load with a small amount of electric power. In a case where the vehicle 10 is traveling, the vehicle power supply apparatus 11 may, at the end of the idle-stop operation, supply the electric power converted by the DC-DC converter 14 to the first vehicle load, and thereafter may, when restarting the engine, supply the electric power from the capacitor 15 to the first vehicle load. This makes it possible to stably operate the first vehicle load, e.g., the braking system load 132, while the vehicle is traveling.

In some example embodiments, in a case where the vehicle 10 is traveling, the vehicle power supply apparatus 11 may, at the end of the idle-stop operation, supply the electric power converted by the DC-DC converter 14 to the braking system load 132, and thereafter may, when restarting the engine, supply the electric power from the capacitor 15 to the braking system load 132. This makes it possible to stably operate the braking system load 132 when the vehicle is traveling.

In some example embodiments, the vehicle power supply apparatus 11 may, in the emergency operation, supply electric power from the capacitor 15 to only the third vehicle load, e.g., the emergency system load 133. Thus, even in a case where the normal power supply 12 is damaged by a collision accident, for example, it is possible to operate the third vehicle load, e.g., the emergency system load 133, such as a door unlocking mechanism, allowing the occupant to escape from the vehicle 10 to the outside.

In some example embodiments, the vehicle power supply apparatus 11 may use the display system load 134 as the second vehicle load. This makes it possible to suppress occurrence of flicker, for example, on the display system load 134 when the idle-stop operation ends.

Although some example embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof. In addition, the example embodiments described above may be combined with each other as appropriate.

For example, although the example embodiment described above gives the steering system load 131 as an example of the first vehicle load, either one or both of the steering system load 131 and the braking system load 132 may be used as the first vehicle load.

The description referring to FIGS. 4A and 4B and FIGS. 5A and 5B describes that electric power may be supplied to the display system load 134 via the DC-DC converter 14, and electric power may be supplied to the steering system load 131 and the braking system load 132 without going through the DC-DC converter 14. In another example, electric power may be supplied to the steering system load 131 and the braking system load 132 via the DC-DC converter 14, and electric power may be supplied to the display system load 134 without going through the DC-DC converter 14.

The description referring to FIGS. 6A and 6B and FIGS. 7A and 7B describes that electric power may be supplied to the braking system load 132 via the DC-DC converter 14, and electric power may be supplied to the steering system load 131 and the display system load 134 without going through the DC-DC converter 14. In another example, electric power may be supplied to the steering system load 131 and the display system load 134 via the DC-DC converter 14, and electric power may be supplied to the braking system load 132 without going through the DC-DC converter 14.

The DC-DC control processor 161 illustrated in FIG. 1B is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the DC-DC control processor 161. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the DC-DC control processor 161 illustrated in FIG. 1B.

The invention claimed is:

1. A vehicle power supply apparatus comprising:
   a power converter circuit configured to convert a voltage of electric power received from a normal power supply of a vehicle, and to supply the converted electric power to vehicle loads of the vehicle, the vehicle being configured to perform idle-stop operation;
   a power storage unit coupled to the power converter circuit; and
   a processor,
   wherein the vehicle loads comprise a first vehicle load related to travel of the vehicle and a second vehicle load not related to the travel of the vehicle, and
   wherein the processor is configured to, at an end of the idle-stop operation,
      supply the converted electric power to one of the first vehicle load and the second vehicle load, and
      supply electric power from the normal power supply to the other of the first vehicle load and the second vehicle load.

2. The vehicle power supply apparatus according to claim 1, wherein the processor is configured to,
   in a case where the vehicle is at a stop, supply the converted electric power to the second vehicle load at the end of the idle-stop operation, and thereafter supply electric power from the power storage unit to the second vehicle load when restarting an engine of the vehicle, and
   in a case where the vehicle is traveling, supply the converted electric power to the first vehicle load at the end of the idle-stop operation, and thereafter supply electric power from the power storage unit to the first vehicle load when restarting the engine.

3. The vehicle power supply apparatus according to claim 1, wherein
   the first vehicle load comprises a steering system load and a braking system load, and
   the processor is configured to, in a case where the vehicle is traveling, supply the converted electric power to the braking system load at the end of the idle-stop operation, and thereafter supply electric power from the power storage unit to the braking system load when restarting an engine of the vehicle.

4. The vehicle power supply apparatus according to claim 1, wherein
   the vehicle loads further comprise a third vehicle load related to emergency operation of the vehicle, and
   the processor is configured to supply electric power from the power storage unit to only the third vehicle load in the emergency operation.

5. The vehicle power supply apparatus according to claim 2, wherein
   the vehicle loads further comprise a third vehicle load related to emergency operation of the vehicle, and
   the processor is configured to supply electric power from the power storage unit to only the third vehicle load in the emergency operation.

6. The vehicle power supply apparatus according to claim 3, wherein
   the vehicle loads further comprise a third vehicle load related to emergency operation of the vehicle, and
   the processor is configured to supply electric power from the power storage unit to only the third vehicle load in the emergency operation.

7. The vehicle power supply apparatus according to claim 1, wherein the second vehicle load comprises display equipment.

8. The vehicle power supply apparatus according to claim 2, wherein the second vehicle load comprises display equipment.

9. The vehicle power supply apparatus according to claim 3, wherein the second vehicle load comprises display equipment.

10. The vehicle power supply apparatus according to claim 4, wherein the second vehicle load comprises display equipment.

11. The vehicle power supply apparatus according to claim 5, wherein the second vehicle load comprises display equipment.

12. The vehicle power supply apparatus according to claim 6, wherein the second vehicle load comprises display equipment.

* * * * *